(12) United States Patent
Lee

(10) Patent No.: US 12,391,349 B2
(45) Date of Patent: Aug. 19, 2025

(54) LIFE JACKET, AIR BLOWING MEMBER AND METHOD FOR COMBINING THERE OF

(71) Applicant: Myungja Lee, Seocho-gu Seoul (KR)

(72) Inventor: Myungja Lee, Seocho-gu Seoul (KR)

( * ) Notice: Subject to any disclaimer, the term of this patent is extended or adjusted under 35 U.S.C. 154(b) by 532 days.

(21) Appl. No.: 17/766,518

(22) PCT Filed: Oct. 14, 2020

(86) PCT No.: PCT/KR2020/014046
§ 371 (c)(1),
(2) Date: Apr. 4, 2022

(87) PCT Pub. No.: WO2021/075861
PCT Pub. Date: Apr. 22, 2021

(65) Prior Publication Data
US 2022/0388614 A1    Dec. 8, 2022

(30) Foreign Application Priority Data

Oct. 18, 2019  (KR) ........................ 10-2019-0129914

(51) Int. Cl.
*B63C 9/125*   (2006.01)
*B29C 65/00*   (2006.01)
(Continued)

(52) U.S. Cl.
CPC ............ *B63C 9/1255* (2013.01); *B29C 65/02* (2013.01); *B29C 66/729* (2013.01); *B63C 9/18* (2013.01);
(Continued)

(58) Field of Classification Search
CPC ......... B63C 9/1255; B63C 9/18; B29C 65/02; B29C 65/04; B29C 65/18; B29C 66/24221; F16L 11/00; B29L 2031/485
See application file for complete search history.

(56) References Cited

U.S. PATENT DOCUMENTS

| 369,319 A | * | 9/1887 | Creamer et al. | ........ B63C 9/082 441/81 |
| 3,068,500 A | * | 12/1962 | Silverman | ............. B63C 9/1255 441/118 |

(Continued)

FOREIGN PATENT DOCUMENTS

| FR | 2620416 A | * | 3/1989 | ............. B63C 11/08 |
| JP | 2012111275 A | | 6/2012 | |

(Continued)

OTHER PUBLICATIONS

Korean Intellectual Property Office. International Search Report mailed Feb. 2, 2021. International Patent Application No. PCT/KR2020/014046. Korean Language. 3 pages.

(Continued)

*Primary Examiner* — Anthony D Wiest
(74) *Attorney, Agent, or Firm* — Procopio, Cory, Hagreaves & Savitch LLP

(57) ABSTRACT

The present invention provides a life jacket. In an embodiment, the life jacket includes a jacket member, and an air blowing member which is provided in the jacket member to inject air to the jacket member, wherein the air blowing member includes a base part coupled with the jacket member, and a tube part extending from the base part, wherein a flexible portion is formed in a part or the entire of the tube part.

17 Claims, 12 Drawing Sheets

(51) Int. Cl.
 *B29C 65/02* (2006.01)
 *B63C 9/18* (2006.01)
 *F16L 11/00* (2006.01)
 *B29L 31/48* (2006.01)

(52) U.S. Cl.
 CPC ......... *F16L 11/00* (2013.01); *B29L 2031/485* (2013.01)

(56) References Cited

U.S. PATENT DOCUMENTS

| | | | |
|---|---|---|---|
| 3,107,373 | A | 10/1963 | Mellon, Jr. et al. |
| 4,000,534 | A | 1/1977 | Cerniway et al. |
| 4,779,554 | A | 10/1988 | Courtney |
| 6,666,622 | B1 * | 12/2003 | Courtney ................ B63C 11/30 441/115 |

FOREIGN PATENT DOCUMENTS

| | | |
|---|---|---|
| JP | 2013078962 A | 5/2013 |
| JP | 2013082412 A | 5/2013 |
| KR | 2003753880000 | 3/2005 |
| KR | 1020150008558 A | 1/2015 |

OTHER PUBLICATIONS

Korean Intellectual Property Office. International Search Report mailed Feb. 2, 2021. International Patent Application No. PCT/KR2020/014046. English Language Translation. 2 pages.

* cited by examiner

LIFE JACKET, AIR BLOWING MEMBER AND METHOD FOR COMBINING THERE OF

CROSS-REFERENCE TO RELATED APPLICATIONS

This application is a U.S. National Stage entry of PCT Application No. PCT/KR2020/014046 filed Oct. 14, 2020, the entire contents of which are incorporated herein by reference. Corresponding PCT Application No. PCT/KR2020/014046 claims the benefit of Republic of Korea Patent Application No. 10-2019-0129914 filed Oct. 18, 2019, the entire contents of which are also incorporated herein by reference.

TECHNICAL FIELD

The present invention relates to a life jacket, an air blowing member provided therefor, and a method for combining the life jacket and the air blowing member.

BACKGROUND ART

A life jacket protects the safety of users from various maritime accidents that are likely to occur during maritime activities such as fishing boats, ships, fishing, marine leisure sports, marine operation, safety personnel, and the like, and is worn on an upper body including the shoulder and the front of the chest from the back of the neck in a body to allow the body to float even if falling into the water and protect human life.

FIG. 1 illustrates a conventional life jacket. FIG. 1 illustrates a self-inflating life jacket of the conventional life jacket. In a conventional self-inflating life jacket 10, moisture permeating through a gas supply device 30 at sea melts a fixture (not illustrated) to pierce an inlet of a cartridge 31 and then the gas in a gas cylinder 34 is instantly injected into a jacket member 20 so that the gas is filled in the jacket member 20.

When the injected gas is not sufficient or when the injected gas is naturally removed over time, the life jacket requires additional gas, but in this case, an air blowing member 50 capable of manually injecting air is provided. On the other hand, the air blowing member 50 also acts as a configuration for removing air after the use of the life jacket.

The conventional air blowing member 50 is provided as a tube member bent into an "L" shape so that a blowing port 54 is positioned near the mouth of a wearer when the life jacket is worn. In addition, since the tube member is bent into the "L" shape, the air blowing member 50 may be in close contact with the life jacket.

However, in the conventional air blowing member 50, as illustrated in FIG. 2, during manufacturing, there are problems that a portion B where a second part 53 is projected from a base part 51 is not sufficiently bonded by a bent portion between a first part 52 and the second part 53 and only a remaining portion A is bonded, and a product defect occurs due to the portion B that is not sufficiently bonded. In addition, since the blowing port 54 is fixed in the direction of the wearer's mouth, another person cannot inject air instead of the wearer in an emergency situation.

FIG. 3 illustrates another prior art. As illustrated in FIG. 3, an air blowing member 150 in the form of a non-bent straight line 152, extending from base 151 to upper portion 155, has a low bonding failure rate with the jacket during manufacturing, but is short in length and the blowing port cannot fundamentally be directed to the wearer's mouth or cannot be positioned close to the wearer's mouth, so that it is inconvenient to inject air.

DISCLOSURE

Technical Problem

An object of the present invention is to provide a life jacket with less bonding failure between a jacket member and an air blowing member, and a manufacturing method thereof.

Another object of the present invention is to provide an air blowing member capable of freely adjusting a direction and a position of a blowing port and allowing a wearer or a third party to inject air in a comfortable state, and a life jacket including the same. Yet another object of the present invention is to provide an air blowing member capable of adjusting a length and a life jacket including the same.

Other objects of the present invention are not limited thereto, and other objects, which are not mentioned above, will be apparent to those skilled in the art from the following description.

Technical Solution

The present invention provides a life jacket. In an embodiment, the life jacket includes a jacket member; and an air blowing member which is provided in the jacket member to inject air to the jacket member, wherein the air blowing member includes a base part coupled with the jacket member; and a tube part extending from the base part, wherein a flexible portion is formed in a part or the entire of the tube part.

In an embodiment, the tube part may include a first tube portion and a second tube portion, wherein the first tube portion may extend from the base part, and the flexible portion may be provided between the first tube portion and the second tube portion.

In an embodiment, the base part and the tube part may be integrally formed.

In an embodiment, the base part and the tube part may be provided as separate components from each other to be coupled to each other.

In an embodiment, the base part may include a base portion provided in a ring-shaped plate; and an extension portion extending from an inner diameter of the base portion, wherein the extension portion and the tube part may be coupled to each other.

In an embodiment, the flexible portion may be provided in the form of a corrugate tube.

In an embodiment, the flexible portion may be provided to be adjustable in length.

In addition, the present invention provides an air blowing member for a life jacket which is provided in the life jacket to inject air to the life jacket. In an embodiment, the air blowing member includes a base part coupled to the life jacket; and a tube part extending from the base part, wherein a flexible portion may be formed in a part or the entire of the tube part.

In an embodiment, the tube part may include a first tube portion and a second tube portion, wherein the first tube portion may extend from the base part, and the flexible portion may be provided between the first tube portion and the second tube portion.

In an embodiment, the base part and the tube part may be integrally formed.

In an embodiment, the base part and the tube part may be provided as separate components from each other to be coupled to each other.

In an embodiment, the base part may include a base portion provided in a ring-shaped plate; and an extension portion extending from an inner diameter of the base portion, wherein the extension portion and the tube part may be coupled to each other.

In an embodiment, the flexible portion may be provided in the form of a corrugate tube.

In an embodiment, the flexible portion may be provided to be adjustable in length.

Further, the present invention provides a method for combining a life jacket and an air blowing member. In an embodiment, the method for combining the life jacket and the air blowing member includes steps of preparing a fabric constituting the life jacket; preparing an air blowing member including a base part forming a coupling surface with the fabric; and a tube part extending from the base part and provided with a flexible portion formed in a part or the entire of the tube part; and coupling the fabric with the air blowing member.

In an embodiment, the coupling of the fabric with the air blowing member may include overlaying the fabric and the coupling surface of the base part; and thermal-bonding the jacket member along the circumference of the coupling surface of the base part.

In an embodiment, the base part and the tube part may be integrally formed, and the overlaying the fabric and the coupling surface of the base part may include passing the tube part through a hole of the fabric and contacting the coupling surface of the base part with the fabric.

In an embodiment, the base part and the tube part may be provided as separate components from each other, the base part may include a base portion provided in a ring-shaped plate having providing a coupling surface with the fabric and an extension portion extending from an inner diameter of the base portion, and the overlaying the fabric and the coupling surface of the base part comprises passing the extension portion of the base part through a hole of the fabric and contacting the base portion of the base part with the fabric, and the method further comprises coupling the tube part to the extension portion of the base part after thermal-bonding the jacket member along the circumference of the coupling surface of the base part.

In an embodiment, the base part and the tube part may be provided as separate components from each other, the base part may include a base portion provided in a ring-shaped plate and having a coupling surface with the fabric and an extension portion extending from an inner diameter of the base portion, and the base part comprises a base portion provided in a ring-shaped plate and having a coupling surface with the fabric and an extension portion extending from an inner diameter of the base portion, and the overlaying the fabric and the coupling surface of the base part may comprise coupling the tube part with the extension portion of the base part and passing the extension portion of the base part and the tube part through a hole of the fabric and contacting the base portion of the base part with the fabric.

Advantageous Effects

According to an embodiment of the present invention, there is less bonding failure between the jacket and the air blowing member.

According to an embodiment of the present invention, as the angle of the tube member may be adjusted to a predetermined angle, it is possible to freely adjust the direction and the position of the blowing port and allow a wearer to inject air in a comfortable state and to allow a third party instead of the wearer to inject the air in an emergency situation.

According to an embodiment of the present invention, as the length may be adjusted to a predetermined length, it is possible to allow the wearer to comfortably inject air while wearing the life jacket despite different wearer's bodies.

In addition, in the present invention, since the air blowing member may be freely bent, there is no difficulty in folding the jacket for storage.

In addition, according to the present invention, the air blowing member and the life jacket may be in close contact with each other while minimizing air leakage.

The effect of the present invention is not limited to the foregoing effects, and non-mentioned effects will be clearly understood by those skilled in the art from the present specification and the accompanying drawings.

MODES FOR THE INVENTION

Figure 1:
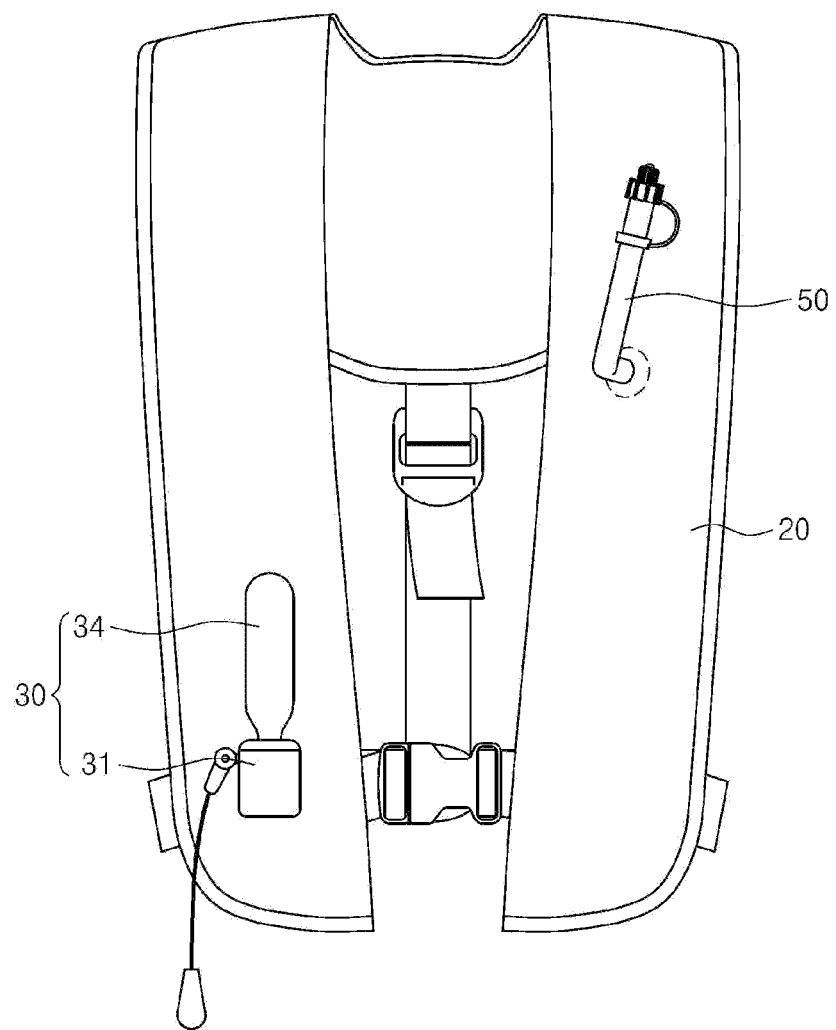
FIG. 1 illustrates a conventional life jacket.
Figure 2:
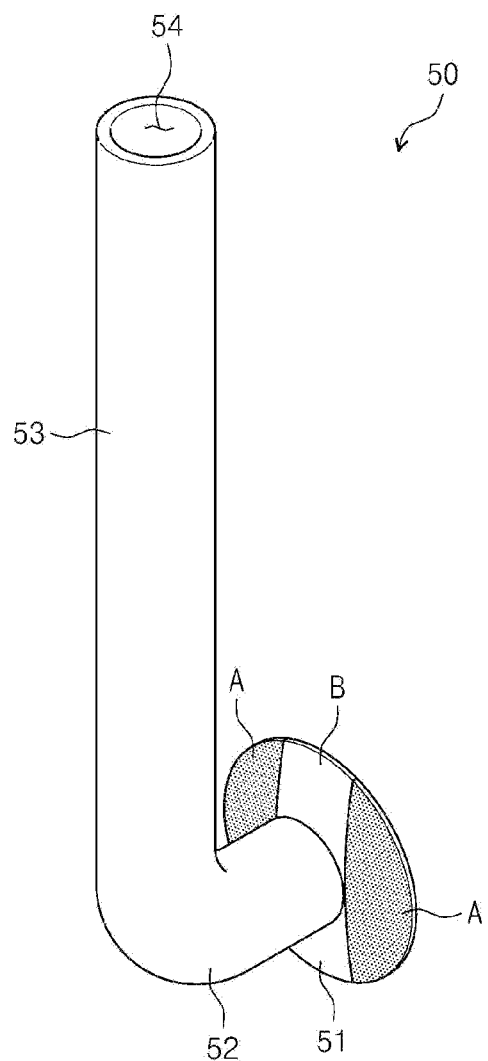
FIG. 2 illustrates an air blowing member provided in the conventional life jacket.
Figure 3:
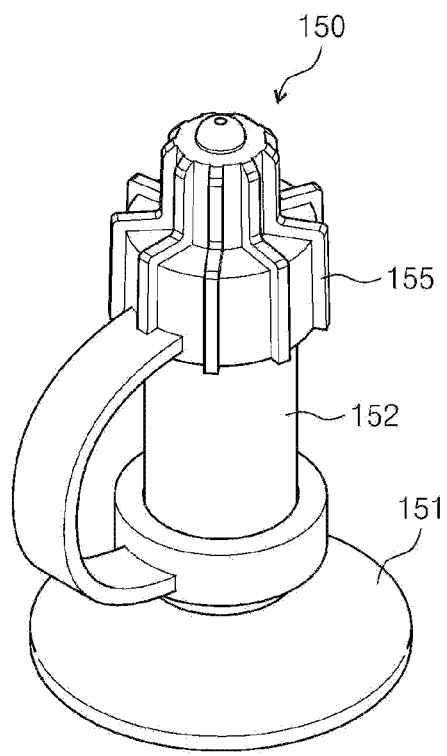
FIG. 3 illustrates another conventional air blowing member.

Hereinafter, embodiments of the present invention will be described in more detail with reference to the accompanying drawings. The embodiments of the present invention can be modified in various forms, and it should not be construed that the scope of the present invention is limited to embodiments to be described below. The embodiments are provided to more completely describe the present invention to those skilled in the art. Therefore, shapes of components in the drawings will be exaggerated to emphasize a more clear description.

Figure 4:
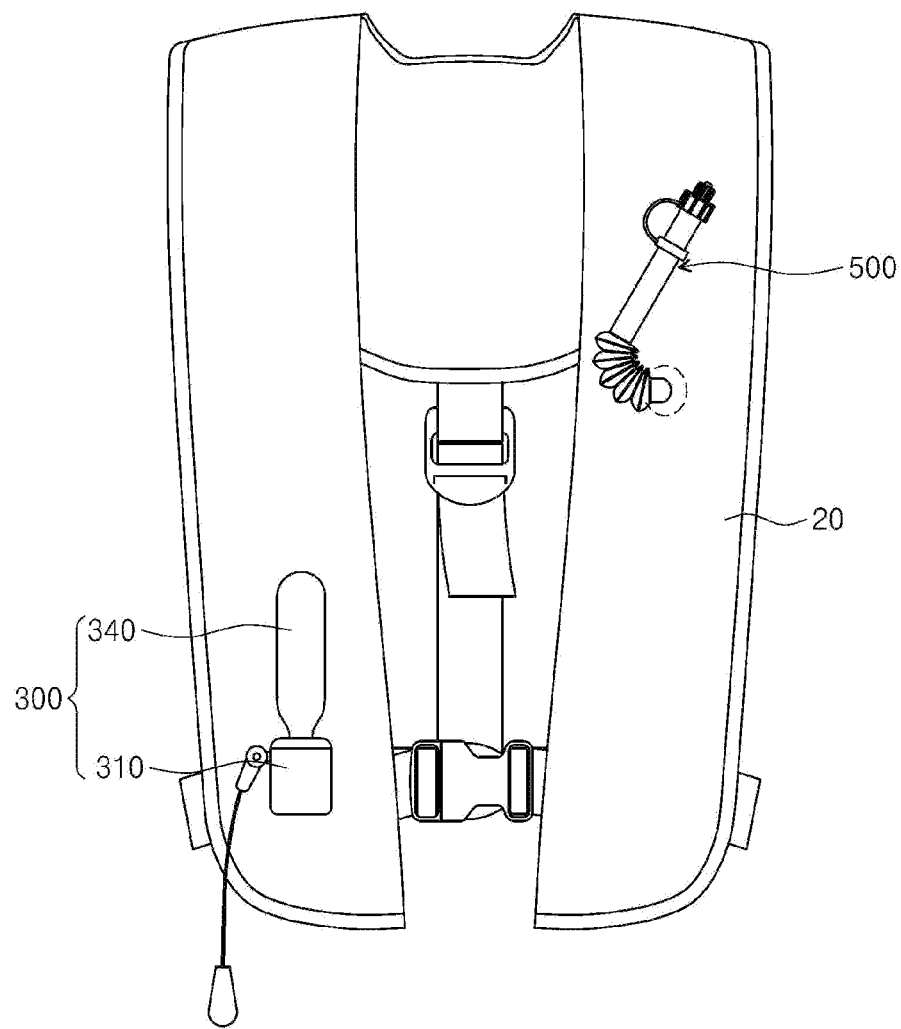
FIG. 4 illustrates a life jacket according to a first embodiment of the present invention.

FIG. 4 illustrates a life jacket 100 according to an embodiment of the present invention. Referring to FIG. 4, the life jacket 100 includes a jacket member 20, a gas supply device 300, and an air blowing member 500.

The jacket member 20 is a member worn by the wearer on the upper body including the shoulder and the front of the chest from the back of the neck of the body. The jacket member 20 may be filled with gas therein. When the jacket member 20 is filled with gas, the jacket member 20 may float on water. Accordingly, the jacket member 20 may float the wearer's body on the water.

The gas supply device 300 is provided on the left and right sides of the jacket member 20. Although it does not matter where the wearer may easily operate, the gas supply device 300 may be generally provided at a lower side of the jacket member 20 so that the wearer may easily operate by the hand. In the gas supply device 300, when water is injected or a safety pin 310 is pulled, an explosion needle explodes a gas cylinder 340. When the gas cylinder 340 is exploded, the jacket member 20 is filled with the gas.

The air blowing member 500 may be provided on one side or the other side where the gas supply device 300 is provided in the jacket member 20. In FIG. 4, the air blowing member 500 and the gas supply device 300 are provided on both left and right sides of the jacket member 20, but may be provided on the same side. The air blowing member 500 is enough to be in a part of the jacket member suitable to inject air through a blowing port 535 (see FIG. 6) by the user. In order to prevent unnecessary material waste, the air blowing member 500 is preferably provided above the jacket member 20. The air blowing member 500 will be described in detail with reference to FIG. 5.

Figure 5:
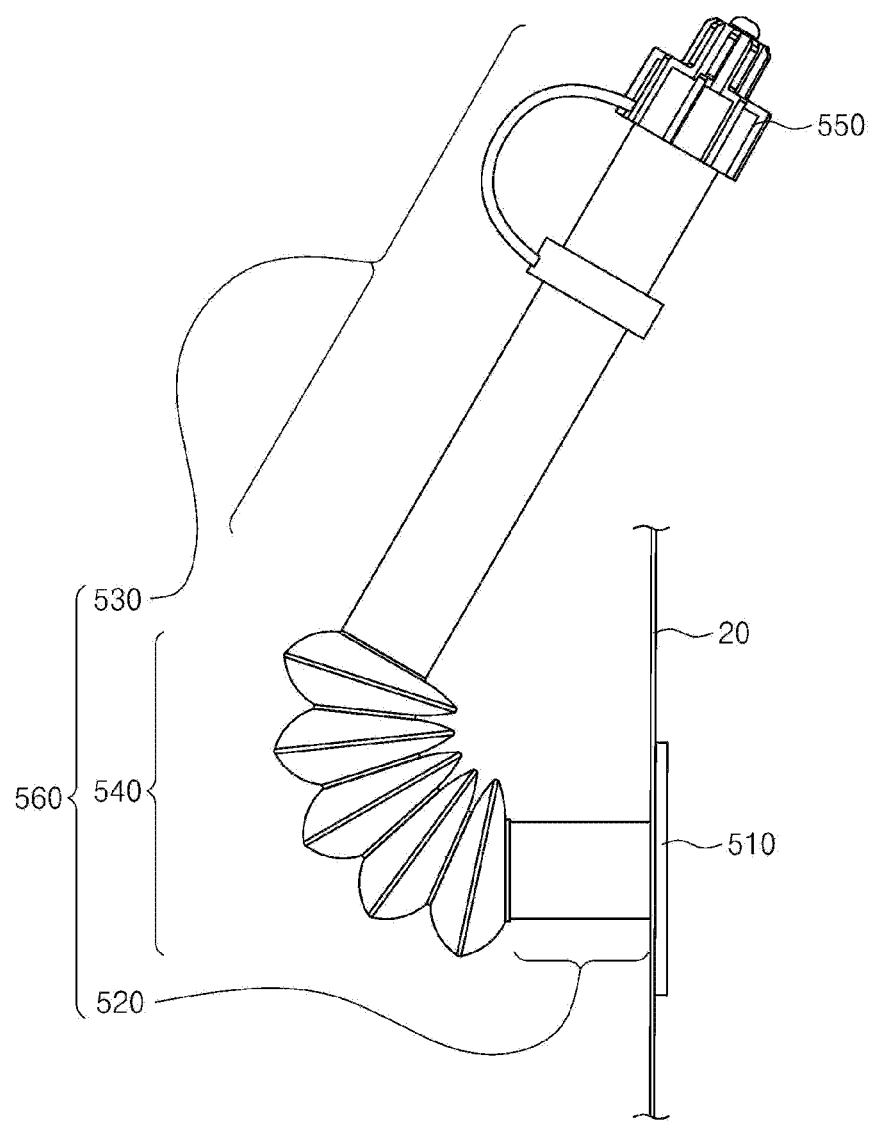
FIG. 5 illustrates an air blowing member according to the first embodiment of the present invention.

FIG. 5 illustrates the air blowing member 500 according to an embodiment of the present invention. The air blowing member 500 is a configuration for injecting air into the jacket member 20. The air blowing member 500 includes a base part 510 and a tube part 560. According to an embodiment, the base part 510 and the tube part 560 may be provided integrally. The air blowing member 500 may be made of, for example, a urethane material.

The base part 510 is a configuration for providing a coupling surface (e.g., an upper surface of the base part 510) with the jacket member 20. The coupling surface of the base part 510 is coupled, for example, thermal-bonded to the jacket member 20. The base part 510 is provided in a plate shape. In an embodiment, the base part 510 is provided as a ring-shaped disk. The ring shape is not limited to a circular plate, and may be various shapes, for example, an oval or a square. As the base part 510 has a larger area, the coupling surface with the jacket member 20 become wider.

In an embodiment, the tube part 560 extends from the base part 510. The tube part 560 includes a first tube portion 520, a second tube portion 530, and a flexible portion 540. The first tube portion 520 extends from the base part 510. The flexible portion 540 connecting the first tube portion 520 and the second tube portion 530 is provided between the first tube portion 520 and the second tube portion 530. The flexible portion 540 divides the tube part 560 into the first tube portion 520 and the second tube portion 530. In an embodiment, although the first tube portion 520 is included, the first tube portion 520 and/or the second tube portion 530 may be omitted if necessary. In an embodiment, the first tube portion 520 is omitted so that the flexible portion 540 may extend from the base part 510 (not illustrated). According to an embodiment, the first tube portion 520 and the second tube portion 530 are omitted, so that the flexible portion 540 may form the entire tube part 560 (not illustrated). In the case where the flexible portion 540 forms the entire tube part 560, the flexible portion 540 may be implemented in the form of a corrugate tube as described above, or may also be implemented in a tube form using a flexible material without using the corrugate tube, and in this case, it is easy to be coupled with other configurations (e.g., a cap and a base part).

In an embodiment, the flexible portion 540 is provided to be adjusted in length. In an embodiment, the flexible portion 540 is provided to be adjusted in angle to a predetermined angle. In the illustrated embodiment, the flexible portion 540 is provided in the form of a corrugate tube. The corrugate tube enables length adjustment and angle (direction) adjustment. The flexible portion 540 has been provided in the form of the corrugate tube in the illustrated embodiment, but is not limited thereto, and it will be apparent to those skilled in the art that the flexible portion 540 can be modified into a flexible material that can be freely adjusted in length and/or angle. According to an embodiment of the present invention, as the length and the angle (direction) of the tube member may be adjusted, it is possible to freely adjust the direction and the position of the blowing port to allow a wearer to inject air in a comfortable state and to allow a third party instead of the wearer to inject the air in an emergency situation. In addition, despite the wearer's bodies different from each other, the wearer may comfortably inject the air by appropriately adjusting the length and the direction of the tube member while wearing the life jacket.

A cap 550 is coupled to an end of the tube member 560. In an embodiment, the cap 550 is coupled to the second tube portion 530. The cap 550 opens when the air is injected or removed, and closes when the injection of air is completed, thereby blocking the flow of air. Although not illustrated, the tube member 560 may be provided with, for example, a check valve (not illustrated) at an end of the tube member 560 near the blowing port 535 (see FIG. 6). The check valve (not illustrated) allows the air to flow in one direction. The check valve (not illustrated) opens in the air injection direction when the air is injected, and closes when the air injection is stopped, thereby preventing the air from being removed to the outside.

Figure 6:
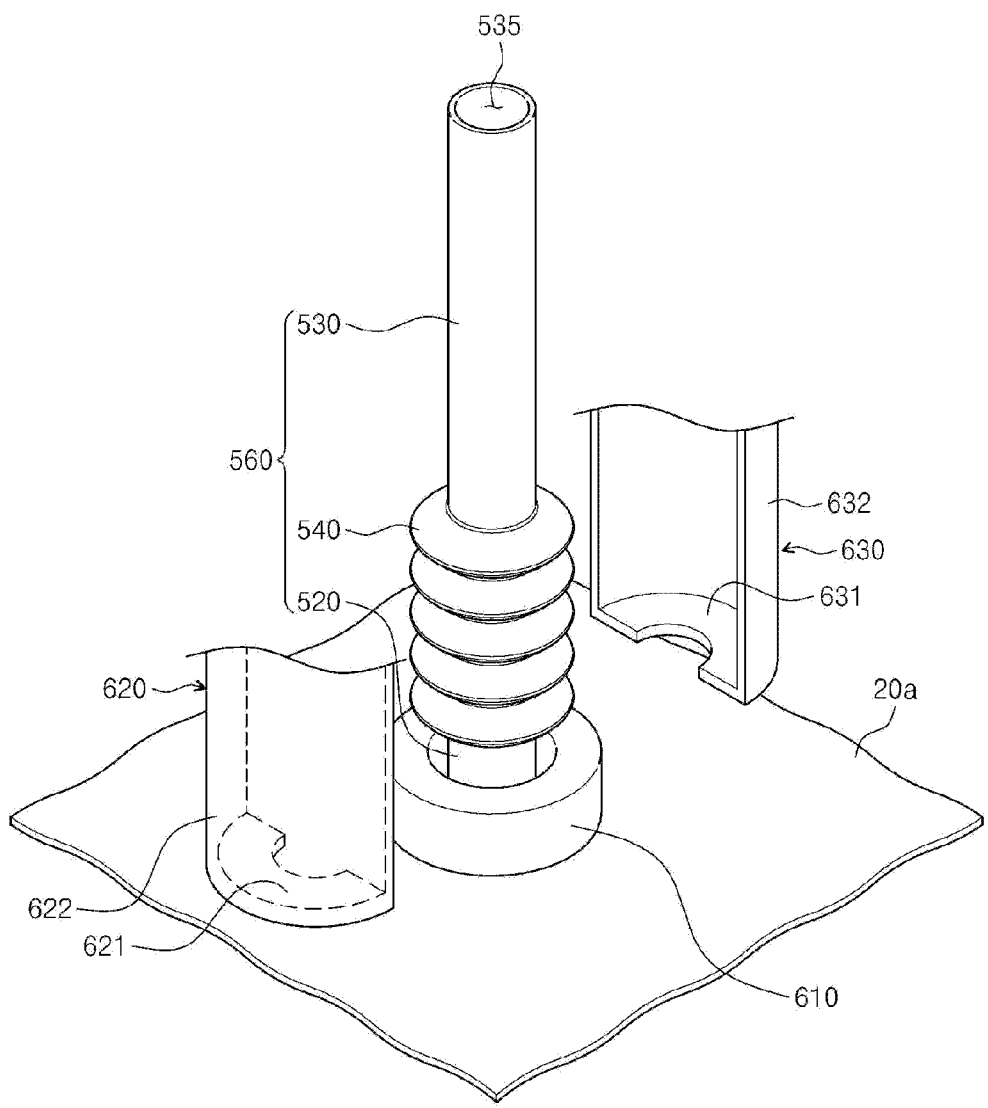
FIGS. 6 and 7 illustrate a method for combining a jacket member and an air blowing member when a base part and a tube part are integrally formed according to the first embodiment of the present invention.
Figure 7:
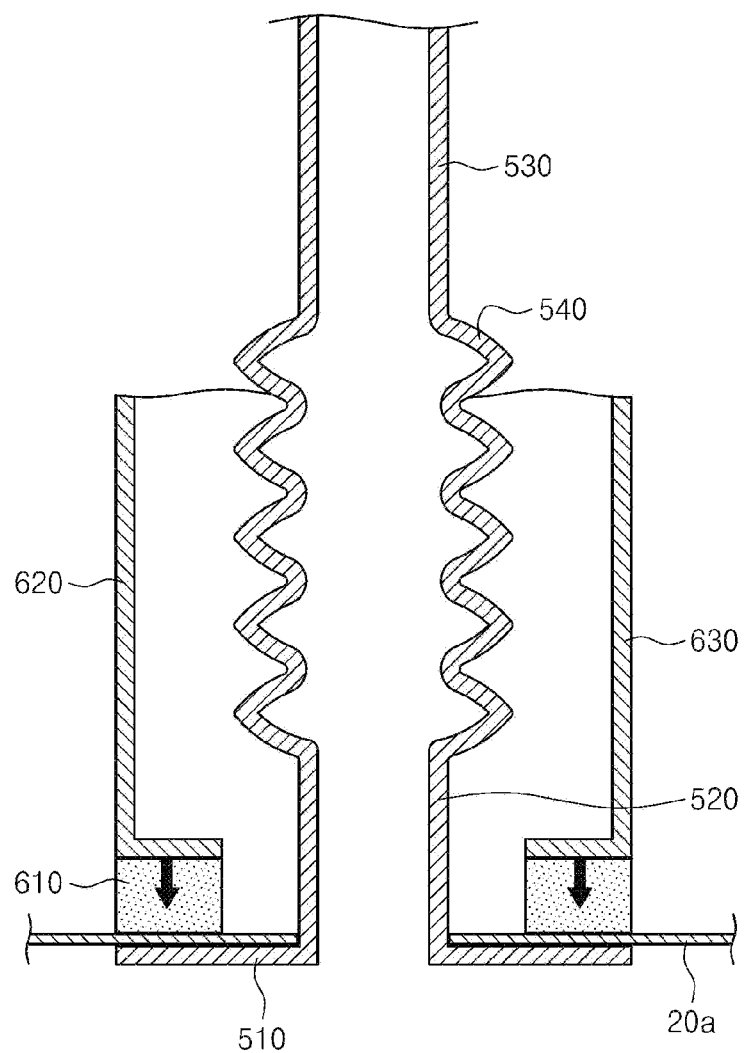

FIGS. 6 and 7 illustrate a method for combining a jacket member and an air blowing member when a base part and a tube part are integrally formed according to an embodiment of the present invention. The method will be described with reference to FIGS. 6 and 7.

A fabric 20a constituting the jacket member 20 is prepared. The fabric 20a is, for example, a waterproof material. The fabric 20a may include, for example, an inner fabric made of a waterproof material and an outer fabric for protecting the inner fabric. The inner fabric may be provided with a vinyl material. The outer fabric as a textile material may be provided with a relatively comfortable material compared to vinyl when coming into contact with the body. The outer fabric of the fabric 20a may be omitted. A hole is formed in the fabric 20a. The hole of the fabric 20a is formed in a size through which the tube part 560 of the air blowing member 500 may pass and the base part 510 does not pass. The tube part 560 passes through the hole while the upper surface (coupling surface) of the base part 510 of the air blowing member 500 is overlapped with the fabric 20a. Then, the fabric 20a and the base part 510 are in contact with each other. Accordingly, the tube part 560 passes through the hole of the fabric 20a while the fabric 20a is positioned on the upper portion (coupled surface) of the base part 510. In addition, while the base part 510 is placed below, a ring member 610 that assists the pressure and heat transfer to the upper portion of the fabric 20a is coupled (by passing the tube part 560 through an inner diameter of the ring member 610). The fabric 20a and the base part 510 may be bonded to each other by thermal bonding. As an example of thermal bonding, methods such as heat bonding, high frequency bonding, ultrasonic bonding, and the like may be provided. Press members 620 and 630 are positioned above the ring member 610 and the fabric 20a of the jacket member 20 and the base part 510 are thermal-bonded to each other by energy transmitted by heating the ring member 610 under pressure. At this time, since the ring member 610 presses the entire circumference of the base part 510, the entire circumference of the base part 510 is bonded to the fabric 20a, thereby preventing bonding failure. According to an embodiment, instead of the ring member 610, the press members 620 and 630 may be in direct contact with the fabric 20a and the base part 510 to transmit energy.

The press members 620 and 630 may be provided in a circular cross-section. The press members 620 and 630 may be provided as a first press member 620, including a base 621 and a side 622, and a second press member 630, including a base 631 and a side 623. The first press member 620 and the second press member 630 may be combined with each other to form a circle. The cross-section of the first press member 620 and the second press member 630 in contact with the ring member 610 may be provided in the same manner as a lateral cross-section of the ring member 610 by combining the first press member 620 and the second press member 630. Meanwhile, the first press member 620 and the second press member 630 may be integrally formed.

As described above, when the jacket member and the air blowing member are combined with each other, the circumference of the base part 510 may be uniformly bonded to the fabric 20a, so that the bonding failure between the jacket member and the air blowing member is reduced.

Figure 8:
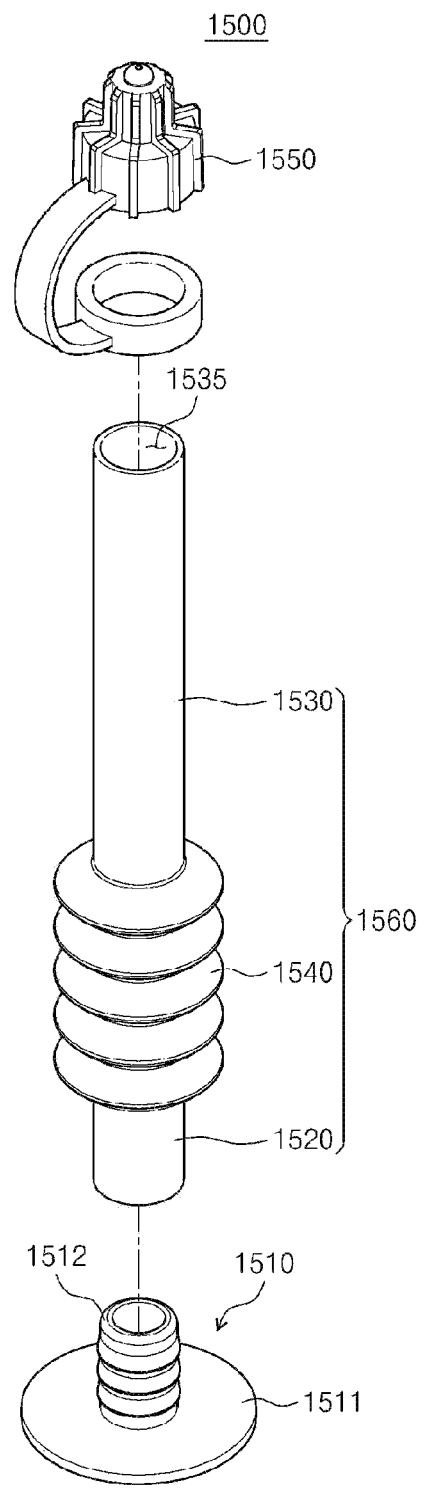
FIG. 8 is an exploded perspective view of an air blowing member 1500 according to a second embodiment of the present invention.

According to another embodiment, the base part and the tube part may be formed separately. FIG. 8 is an exploded perspective view of an air blowing member 1500 according to another embodiment when the base part and the tube part are formed separately.

The air blowing member 1500 according to another embodiment includes a tube part 1560 constituted by a first tube portion 1520, a second tube portion 1530, and a flexible portion 1540, a base part 1510, and a cap 1550 connecting to an upper portion 1535 of the second tube portion 1530. The tube part 1560 and the base part 1510 are provided as separate components. The tube part 1560 and the base part 1510 may be bonded to each other by bonding, as be described below.

When the tube part 1560 and the base part 1510 are provided as separate components, the entire tube part 1560 may be flexible. The base part 1510 may be made of a material having good thermal bonding to the fabric 20a.

The base part 1510 includes a base portion 1511 and an extension portion 1512. The base portion 1511 is a portion coupled to the life jacket. The extension portion 1512 is a portion that extends from the base portion 1511 and is coupled to the tube part 1560. The base portion 1511 is provided as a ring-shaped plate as described above. The extension portion 1512 extends from the inner diameter of the base portion 1511.

FIGS. 9, 10, 11 and 12 illustrate a method for combining a jacket member and an air blowing member when a base part and a tube part are separately formed according to another embodiment of the present invention. The method will be described with reference to FIGS. 9, 10, 11 and 12.

Figure 9:
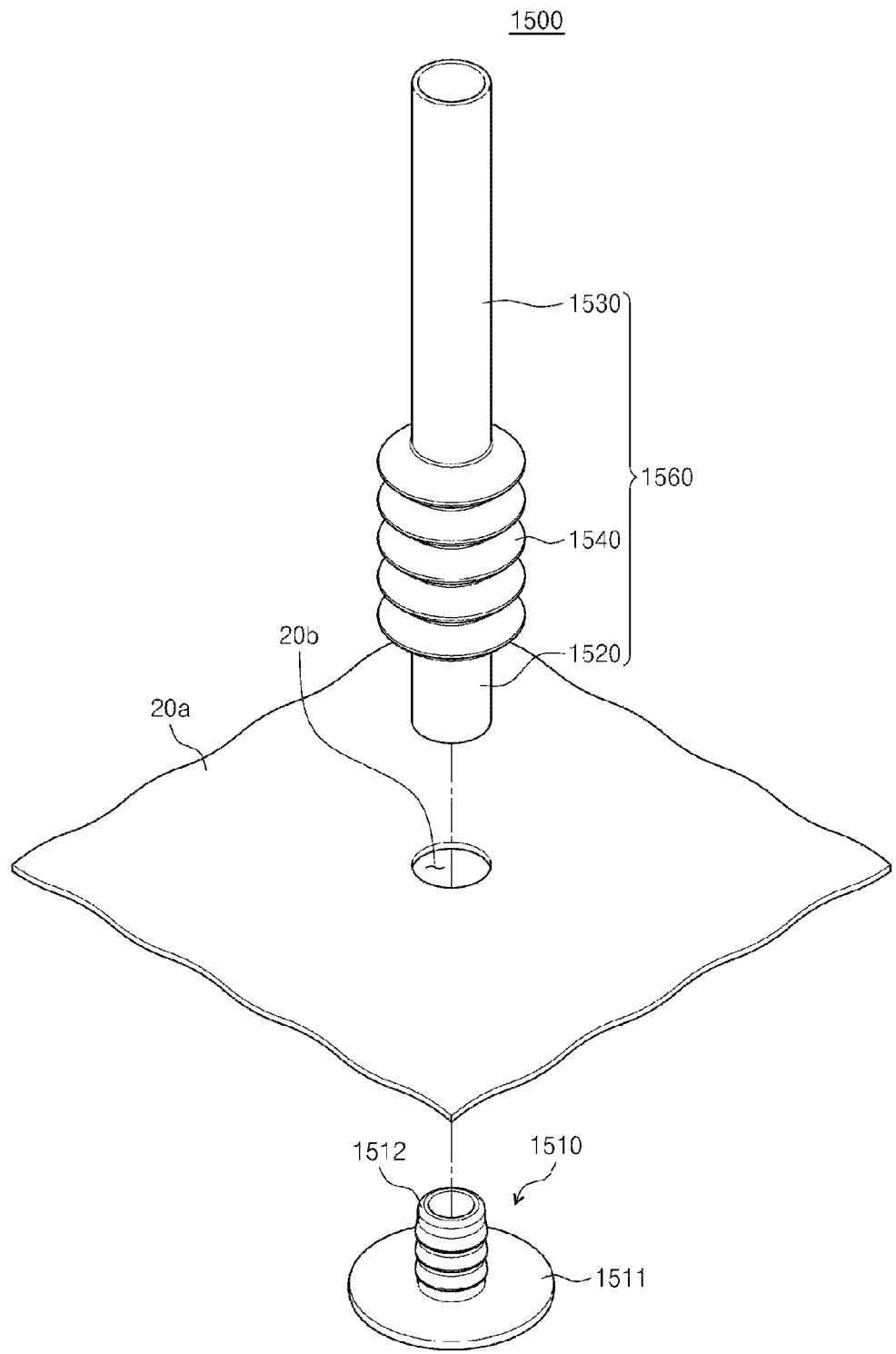
FIGS. 9, 10, 11 and 12 illustrate a method for combining a jacket member and an air blowing member when a base part and a tube part are separately formed according to the second embodiment of the present invention.

FIG. 9 is a perspective view for describing a combination of the air blowing member and the jacket member.

Figure 10:
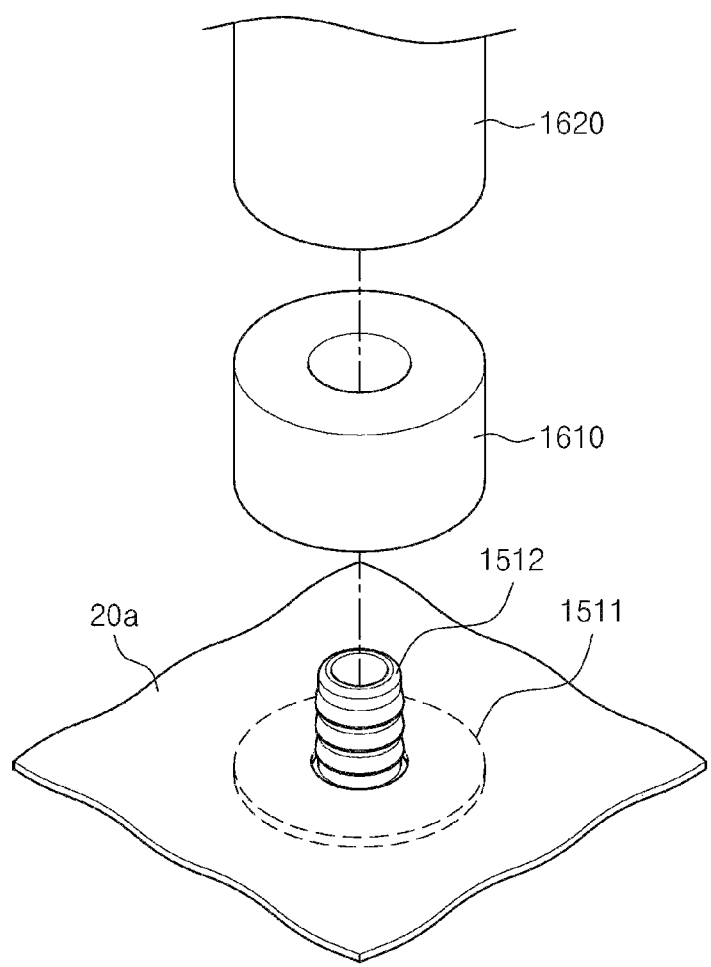

Referring to FIGS. 9 and 10, the fabric 20a constituting the jacket member 20 is prepared. A hole 20b is formed in the fabric 20a. An extension portion 1512 extending from a base portion 1511 of a base part 1510 passes through the hole 20b, and an upper surface (coupling surface) of the base part 1511 is in contact with a lower surface of the fabric 20a.

In addition, a ring member 1610 that assists pressure and heat transfer passes through the extension portion 1512 of the base part 1510 to be coupled to the upper surface of the fabric 20a. At this time, since the ring member 1610 presses the entire circumference of the base portion 1511 of the base part 1510, the entire circumference of the base part 1510 is bonded to the fabric 20a, thereby preventing bonding failure. The ring member 1610 may be formed to be higher than the extension portion 1512. Therefore, a hole may not be formed in a press member 1620 and the bottom thereof may be provided as a flat surface.

Figure 11:
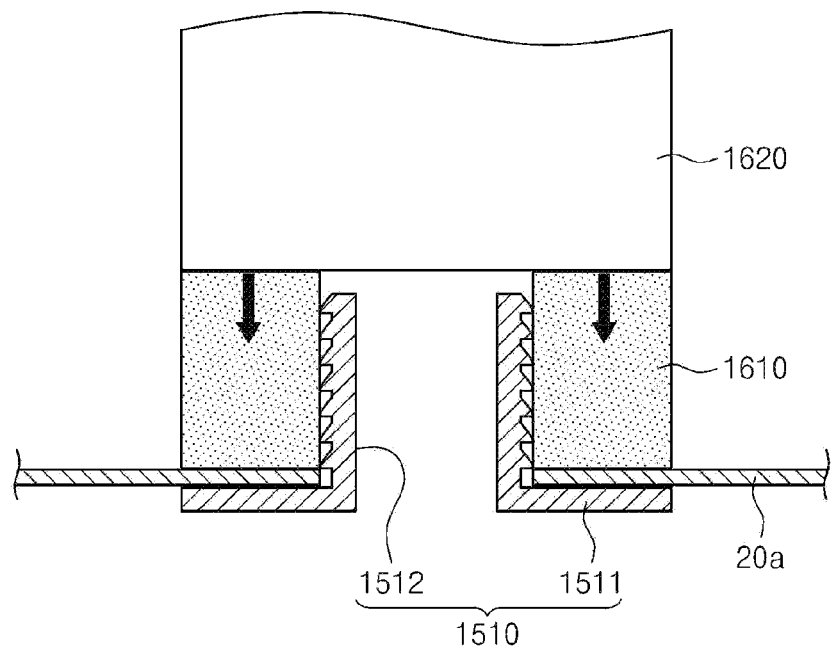

Next, referring to FIG. 11, the fabric 20a and the base part 1510 may be bonded to each other by thermal bonding. As an example of thermal bonding, methods such as heat bonding, high frequency bonding, ultrasonic bonding, and the like may be provided. The press member 1620 is positioned above the ring member 1610 and the fabric 20a of the jacket member 20 and the base part 1510 are thermal-bonded to each other by energy transmitted by heating the ring member 1610 under pressure.

Figure 12:
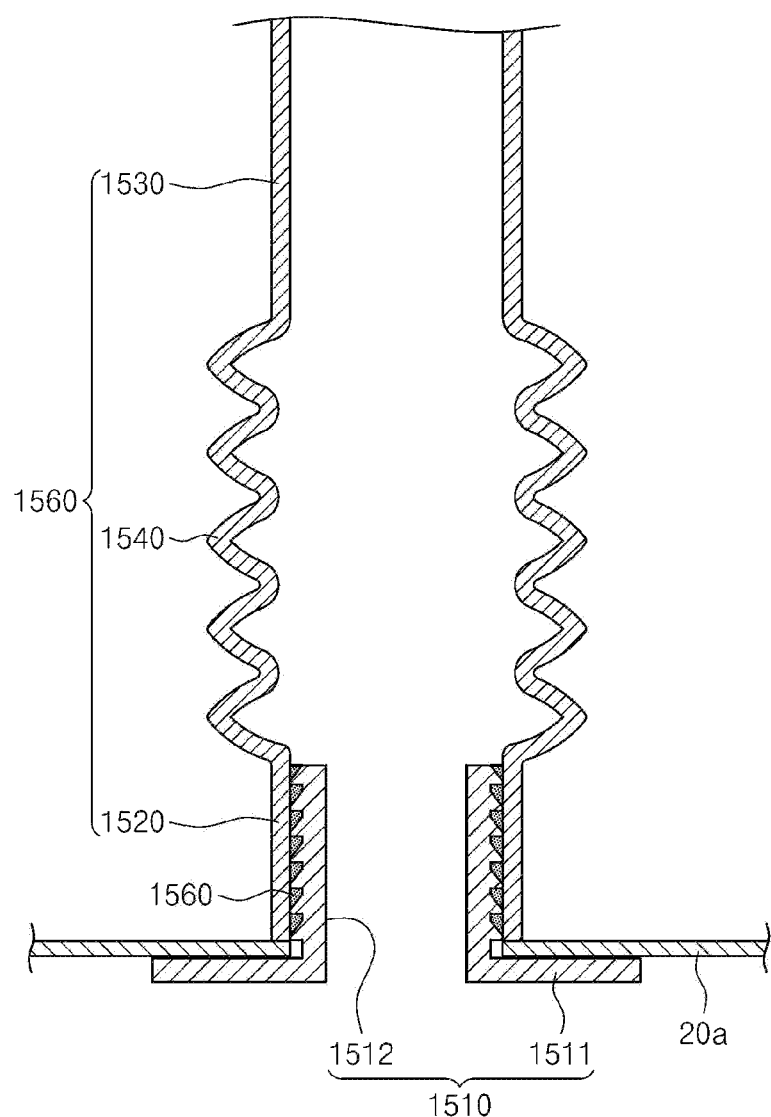

Referring to FIG. 12, when the base part 1510 is coupled to the fabric 20a, the tube part 1560 is coupled to the extension portion 1512 of the base part 1510. The tube part 1560 and the extension portion 1512 may be bonded to each other by a bond.

In the above-described embodiment, after the base part 1510 is bonded to the fabric 20a, the tube part 1560 has been coupled to the base part 1510, but in a different order, after the base part 1510 is first coupled to the tube part 1560, the base part 1510 can be bonded to the fabric 20a. In this case, the base part 1510 may be coupled to the tube part 1560 by the coupling method described with reference to FIGS. 6 and 7 described above.

The foregoing detailed description illustrates the present invention. Further, the above content shows and describes the embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing embodiment describes the best state for implementing the technical spirit of the present invention, and various changes required in specific application fields and uses of the present invention are possible. Accordingly, the detailed description of the invention above is not intended to limit the invention to the disclosed embodiment. Further, the accompanying claims should be construed to include other embodiments as well.

INDUSTRIAL APPLICABILITY

A life jacket of the present invention can be used to protect the user's safety from various marine accidents that are likely to occur during maritime activities, such as fishing boats, ships, fishing, marine leisure sports, marine operation, safety personnel, and the like.

The invention claimed is:
1. A life jacket comprising:
a jacket member; and
an air blowing member coupled with the jacket member to inject air to the jacket member,
wherein the air blowing member comprises
a base part coupled with the jacket member; and
a tube part extending from the base part,
wherein the tube part includes:

a first tube portion extending vertically to the base part and in a straight line from the base part;

a flexible portion extending from the straight line of the first tube portion; and a second tube portion extending from the flexible portion.

2. The life jacket of claim 1, wherein the base part and the tube part are integrally formed.

3. The life jacket of claim 1, wherein the base part and the tube part are provided as separate components from each other to be coupled to each other.

4. The life jacket of claim 3, wherein the base part comprises:

a base portion provided in a ring-shaped plate; and an extension portion extending from an inner diameter of the base portion, and wherein the extension portion and the tube part are coupled to each other.

5. The life jacket of claim 1, wherein the flexible portion is provided in a form of a corrugate tube.

6. The life jacket of claim 1, wherein the flexible portion is provided to be adjustable in length.

7. An air blowing member for use in a life jacket to inject air to the life jacket, the air blowing member comprising:

a base part coupled to the life jacket; and a tube part extending from the base part, wherein the tube part includes:

a first tube portion extending vertically to the base part and in a straight line from the base part;

a flexible portion extending from the straight line of the first tube portion; and a second tube portion extending from the flexible portion.

8. The air blowing member for the life jacket of claim 7, wherein the base part and the tube part are integrally formed.

9. The air blowing member for the life jacket of claim 7, wherein the base part and the tube part are provided as separate components from each other to be coupled to each other.

10. The air blowing member for the life jacket of claim 9, wherein the base part comprises a base portion provided in a ring-shaped plate; and an extension portion extending from an inner diameter of the base portion, wherein the extension portion and the tube part are coupled to each other.

11. The air blowing member for the life jacket of claim 7, wherein the flexible portion is provided in a form of a corrugate tube.

12. The air blowing member for the life jacket of claim 7, wherein the flexible portion is provided to be adjustable in length.

13. A method for combining a life jacket and an air blowing member comprising steps of:

preparing a fabric constituting the life jacket;

preparing an air blowing member including a base part and a tube part, the base part having a coupling surface with the fabric, the tube part extending from the base part and including:

a first tube portion extending vertically to the base part and in a straight line from the base part;

a flexible portion extending from the straight line of the first tube portion; and a second tube portion extending from the flexible portion; and coupling the fabric with the air blowing member.

14. The method for combining the life jacket and the air blowing member of claim 13, wherein the coupling of the fabric with the air blowing member comprises:

overlaying the fabric and the coupling surface of the base part; and thermal-bonding the jacket along a circumference of the coupling surface of the base part.

15. The method for combining the life jacket and the air blowing member of claim 14, wherein the base part and the tube part are integrally formed, and wherein the overlaying the fabric and the coupling surface of the base part comprises:

passing the tube part through a hole of the fabric and contacting the coupling surface of the base part with the fabric.

16. The method for combining the life jacket and the air blowing member of claim 14, wherein the base part and the tube part are provided as separate components from each other, the base part comprises a base portion provided in a ring-shaped plate and having a coupling surface with the fabric and an extension portion extending from an inner diameter of the base portion, the overlaying the fabric and the coupling surface of the base part comprises:

passing the extension portion of the base part through a hole of the fabric and contacting the base portion of the base part with the fabric, and the method further comprises coupling the tube part to the extension portion of the base part after thermal-bonding the jacket member along the circumference of the coupling surface of the base part.

17. The method for combining the life jacket and the air blowing member of claim 14, wherein the base part and the tube part are provided as separate components from each other, the base part comprises a base portion provided in a ring-shaped plate and having a coupling surface with the fabric and an extension portion extending from an inner diameter of the base portion, and the overlaying the fabric and the coupling surface of the base part comprises:

coupling the tube part with the extension portion of the base part and passing the extension portion of the base part and the tube part through a hole of the fabric and contacting the base portion of the base part with the fabric.

\* \* \* \* \*